(12) United States Patent
Rottmann et al.

(10) Patent No.: US 11,607,808 B2
(45) Date of Patent: Mar. 21, 2023

(54) METHOD, APPARATUS AND SYSTEM FOR ROBOTIC PROGRAMMING

(71) Applicant: Siemens Aktiengesellschaft, Munich (DE)

(72) Inventors: Axel Rottmann, Munich (DE); Carlos Morra, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 357 days.

(21) Appl. No.: 16/406,172

(22) Filed: May 8, 2019

(65) Prior Publication Data
US 2019/0344441 A1    Nov. 14, 2019

(30) Foreign Application Priority Data

May 11, 2018 (EP) ..................... 18171829

(51) Int. Cl.
*B25J 9/16* (2006.01)

(52) U.S. Cl.
CPC ........... *B25J 9/1664* (2013.01); *B25J 9/1605* (2013.01); *B25J 9/1633* (2013.01)

(58) Field of Classification Search
CPC combination set(s) only.
See application file for complete search history.

(56) References Cited

U.S. PATENT DOCUMENTS

| | | | |
|---|---|---|---|
| 8,965,576 B2 | 2/2015 | Chen et al. | |
| 9,144,905 B1 | 9/2015 | Sinapov et al. | |
| 10,226,869 B2 | 3/2019 | Chizeck et al. | |
| 11,173,601 B2* | 11/2021 | Satou | B25J 9/163 |
| 2015/0277398 A1 | 10/2015 | Madvil et al. | |
| 2016/0257000 A1* | 9/2016 | Guerin | B25J 9/1605 |
| 2017/0091999 A1* | 3/2017 | Blumenfeld | G06F 3/04847 |
| 2017/0106537 A1 | 4/2017 | Chizeck et al. | |

(Continued)

FOREIGN PATENT DOCUMENTS

| | | |
|---|---|---|
| CN | 102814815 A | 12/2012 |
| CN | 105825752 A | 8/2016 |

(Continued)

OTHER PUBLICATIONS

European Search Report with Application No. 18171829.7 dated Jan. 24, 2019.

*Primary Examiner* — Jeff A Burke
*Assistant Examiner* — Arslan Azhar
(74) *Attorney, Agent, or Firm* — Harness, Dickey & Pierce, P.L.C.

(57) ABSTRACT

A method, apparatus and a system are disclosed for robotic programming. In at least one embodiment of a method for robotic programming, the method includes receiving, from a controller of a robot, movement parameters reflecting movement of the robot manipulated by a user; making a first data model of a robot move, according to the movement parameters; calculating, upon the first data model touching a second data model of a virtual object, parameters of a first force to be fed back to the user for feeling touch by the robot on a physical object corresponding to the virtual object; and sending the parameters of the first force to the controller of the robot, to drive the robot to feed back the first force to the user.

22 Claims, 6 Drawing Sheets

(56) References Cited

U.S. PATENT DOCUMENTS

| | | | | |
|---|---|---|---|---|
| 2017/0235301 A1* | 8/2017 | Atohira | .................. | G05B 19/42 |
| | | | | 700/254 |
| 2018/0085920 A1* | 3/2018 | Yamada | ................. | B25J 9/1633 |
| 2018/0147725 A1* | 5/2018 | Motoyoshi | ............. | B25J 9/1633 |
| 2018/0310999 A1* | 11/2018 | Peine | ..................... | A61B 34/74 |
| 2020/0356235 A1* | 11/2020 | Arimatsu | .............. | G06F 3/0346 |

FOREIGN PATENT DOCUMENTS

| | | |
|---|---|---|
| EP | 2923805 A2 | 9/2015 |
| WO | WO 2011/140704 A1 | 11/2011 |
| WO | WO 2015134391 A1 | 9/2015 |

\* cited by examiner

METHOD, APPARATUS AND SYSTEM FOR ROBOTIC PROGRAMMING

PRIORITY STATEMENT

The present application hereby claims priority under 35 U.S.C. § 119 to European patent application number EP 18171829.7 filed May 11, 2018, the entire contents of which are hereby incorporated herein by reference.

FIELD

Embodiments of the invention generally relate to techniques of robotics programming, and more particularly to a method, apparatus and a system for robotic programming.

BACKGROUND

Usage of a robot in industrial plants and factories is constantly increasing. Robots are getting more powerful, more flexible and at the same time less expensive.

However, programming an industrial robot is typically a complex and labor-intensive task. In general, two groups of programming techniques exist.

1) Teach-in Techniques

Here, a user programs a robot by using the real robot and a real object, such as a work piece. The user moves the robot to desired positions or along favored trajectories and records data. The data how the user controls is also recorded by actuators in the robot. Afterwards, the robot repeats these actions according to the recorded data.

Advantages of teach-in techniques include: a robot can be easily programmed according to real installation of it and objects, and no advanced programming skill is required. While disadvantages are: The objects need to be available for programming, which may be very difficult or even impossible for large objects; no programming prior to commissioning and there is downtime of the robot during programming.

2) Offline Programming

Here, a user programs a robot in a simulation environment. A robot, surroundings of the robot and all objects are mapped into a simulation environment. The user defines positions, trajectories and interactions with work objects virtually. Afterwards a real robot executes these instructions.

Advantages of offline programming include: programming prior to commissioning; programs can easily be changed and adapted; no downtime of the robot during programming. While disadvantages include: the complete surrounding of the robot needs to be accurately mapped into the simulation environment; it require user to have advanced programming skills; too much preparation for simple use cases.

SUMMARY

Embodiments of the present disclosure provide a method, apparatus and a system for robotic programming. Such embodiments improve upon or even solve the dilemma that teach-in techniques can't work for all kinds of objects and offline programming requires complicated simulation of a robot and objects, and provide a solution to give force feedback to a user manipulating a robot during teach-in programming, to let the user feel the physical feedback of a virtual object, which makes the programming procedures go smoothly and efficiently.

Embodiments of the present disclosure provides a system for robotic programming, a method for robotic programming, an apparatus for robotic programming, a robotic system, a computer-readable storage media, and/or a computer program. Advantageous embodiments of the present technique are provided in claims. Features of independent claims may be combined with features of claims dependent on the respective independent claim, and features of dependent claims can be combined together, unless otherwise indicated.

Known robotic programming techniques belong either to the teach-in techniques or offline programming. For example, standard programming, teach pendant programming and lead through programming are all teach-in techniques. Virtual reality is offline programming.

The most commonly used method is still a teach-in technique. In all teach-in approaches, for all the objects with which a robot interacts need to be present. That means, every object, such as a work piece, needs to be available. Dealing with heavy and larger objects, like a chassis frame, increases the teach-in time and makes the process more complex and unsafe.

However, the real object can, of course, be replaced with a duplicate. For instance, it can be produced using a 3D printer. This might reduce the weight of the object and facilitates the teach-in process. Though, using duplicates entails some disadvantages, such as: printing large objects, like a chassis frame, is time consuming and expensive; depending on the size of an object, several persons are needed to handle them; the objects need to be kept in a storage for potential re-teaching of the robot; If the objects are not stored and the robot need to be re-taught, the objects need to be produced again. This increases the teach-in time and the down-time of the robot arm.

At least one embodiment of the present disclosure provides an improvement or even a solution, in circumstances where a robot is being manipulated by a user interacting with a virtual object during teach-in programming. Whereas, the user can't feel direct feedback of contact forces. For instance, if the robot interacts with a real object, the user can feel a direct force once the gripper of the robot hits the real object. In case of virtual objects, this user can't get this kind of direct feedback, which may result in longer teach-in times and longer downtimes of the robot.

According to a first embodiment of the present disclosure, a system for robotic programming is presented. The system includes:

a robot;

a controller of the robot;

a apparatus for robotic programming, communicating with the controller of the robot, configured to set up a first data model of the robot; set up a second data model of a virtual object; receive, from the controller of the robot, movement parameters reflecting movement of the robot manipulated by a user; make the first data model move according to the movement parameters; when the first data model touches the second data model, calculate parameters of a second force to be fed back to the robot by a physical object correspond to the virtual object; calculate, according to the second force, parameters of a first force to be fed back to the user for feeling touch by the robot on the physical object corresponding to the virtual object; and send parameters of the first force to the controller of the robot;

the controller of the robot, further configured to drive the robot to feed back the first force to the user.

According to a second embodiment of the present disclosure, a method for robotic programming is presented, it comprises:
  setting up a first data model of a robot;
  setting up a second data model of a virtual object;
  receiving, from a controller of the robot, movement parameters reflecting movement of the robot manipulated by a user;
  making the first data model move according to the movement parameters;
  when the first data model touches the second data model, calculating parameters of a first force to be fed back to the user for feeling touch by the robot on the physical object corresponding to the virtual object; and
  sending parameters of the first force to the controller of the robot, to drive the robot to feed back the first force to the user.

According to a third embodiment of the present disclosure, an apparatus for robotic programming is presented, it comprises:
  a data model setting up module, configured to
    set up a first data model of a robot; and
    set up a second data model of a virtual object;
  a communication module, configured to receive, from a controller of the robot, movement parameters reflecting movement of the robot manipulated by a user; and a data model controller, configured to
    make the first data model move according to the movement parameters;
    when the first data model touches the second data model, calculate parameters of a first force to be fed back to the user for feeling touch by the robot on the physical object corresponding to the virtual object; and
  the communication module, further configured to send parameters of the first force to the controller of the robot, to drive the robot to feed back the first force to the user.

According to a fourth embodiment of the present disclosure, another apparatus for robotic programming is presented, it comprises:
  a processor, configured to
    set up a first data model of a robot;
    set up a second data model of a virtual object; and
  a receiver, configured to receiving, from a controller of the robot, movement parameters reflecting movement of the robot manipulated by a user;
  the processor, further configured to
    make the first data model move according to the movement parameters;
    when the first data model touches the second data model, calculate parameters of a first force to be fed back to the user for feeling touch by the robot on the physical object corresponding to the virtual object;
  a transmitter, configured to send parameters of the first force to the controller of the robot, to drive the robot to feed back the first force to the user.

According to a fifth embodiment of the present disclosure, a method for controlling a robot is presented, it comprises:
  receiving parameters of a force;
  sending the parameters of the force to at least one motor for at least one joint of the robot, to drive the robot to feed back the force to a user manipulating the robot for feeling at least one of the following items:
    the robot's touch on an object;
    interaction between an object and the environment the robot and the object are both in; and
    the distance of the robot from an object;
  wherein the object is a virtual object or a physical object.

According to a sixth embodiment of the present disclosure, a controller of a robot is presented, it comprises:
  a first communication module, configured to receive parameters of a force; and
  a second communication module, configured to send the parameters of the force to at least one motor for at least one joint of the robot, to drive the robot to feed back the force to a user manipulating the robot for feeling at least one of the following items:
    the robot's touch on an object;
    interaction between an object and the environment the robot and the object are both in; and
    the distance of the robot from an object;
  wherein the object is a virtual object or a physical object.

According to a seventh embodiment of the present disclosure, a controller of a robot is presented, it comprises:
  a processor;
  a memory in electronic communication with the processor, instructions being stored in the memory, the instructions being executable by the processor to:
    receive parameters of a force;
    send the parameters of the force to at least one motor for at least one joint of the robot, to drive the robot to feed back the force to a user manipulating the robot for feeling at least one of the following items:
      the robot's touch on an object;
      interaction between an object and the environment the robot and the object are both in; and
      the distance of the robot from an object;
  wherein the object is a virtual object or a physical object.

According to an eighth embodiment of the present disclosure, a robotic system, comprising a robot and a controller of the robot described above is presented.

According to a ninth embodiment of the present disclosure, a computer-readable storage media is presented, wherein the storage media has stored thereon:
  instructions executable by one or more processors of a computer system, wherein execution of the instructions causes the computer system to perform the method executed by the controller of the robot or the apparatus for robotic programming.

According to an eleventh embodiment of the present disclosure, a computer program is presented. The computer program is being executed by one or more processors of a computer system and performs the method executed by the controller of the robot or the apparatus for robotic programming.

BRIEF DESCRIPTION OF THE DRAWINGS

The above mentioned attributes and other features and advantages of the present technique and the manner of attaining them will become more apparent and the present technique itself will be better understood by reference to the following description of embodiments of the present technique taken in conjunction with the accompanying drawings, wherein.

Figure 1:
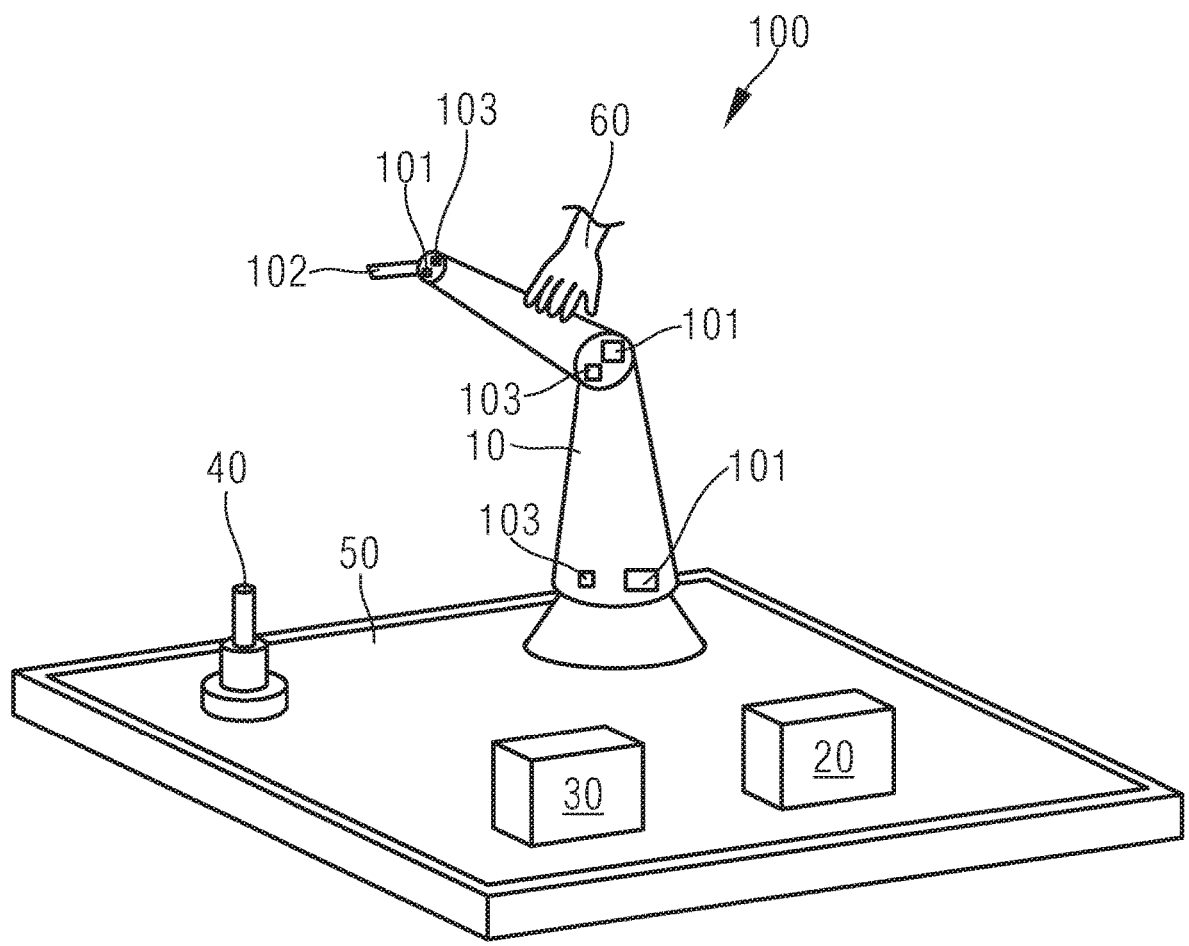
FIG. 1: Schematically represents an example embodiment of a robotic programming system of the present disclosure

10: a robot
20: a controller of the robot10
30: an apparatus for robotic programming
40: a virtual object
50: an environment
60: a user
101: an encoder
102: a gripper
103: a motor
301: a date model setting up module
302: a communication module
303: a data model controller
304: a processor
305: a receiver
306: a transmitter
201: a first communication module
202: a second communication module
203: a processor
204: a memory
801: a fourth force
802: a first force
803: a third force
100: a system for robotic programming
S201~S222: procedure steps

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory.

These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Most of the aforementioned components, in particular the identification unit, can be implemented in full or in part in the form of software modules in a processor of a suitable control device or of a processing system. An implementation largely in software has the advantage that even control devices and/or processing systems already in use can be easily upgraded by a software update in order to work in the manner according to at least one embodiment of the invention.

According to a first embodiment of the present disclosure, a system for robotic programming is presented. The system includes:
  a robot;
  a controller of the robot;
  a apparatus for robotic programming, communicating with the controller of the robot, configured to set up a first data model of the robot; set up a second data model of a virtual object; receive, from the controller of the robot, movement parameters reflecting movement of the robot manipulated by a user; make the first data model move according to the movement parameters; when the first data model touches the second data model, calculate parameters of a second force to be fed back to the robot by a physical object correspond to the virtual object; calculate, according to the second force, parameters of a first force to be fed back to the user for feeling touch by the robot on the physical object corresponding to the virtual object; and send parameters of the first force to the controller of the robot;
  the controller of the robot, further configured to drive the robot to feed back the first force to the user.

According to a second embodiment of the present disclosure, a method for robotic programming is presented, it comprises:
  setting up a first data model of a robot;
  setting up a second data model of a virtual object;
  receiving, from a controller of the robot, movement parameters reflecting movement of the robot manipulated by a user;

making the first data model move according to the movement parameters;
when the first data model touches the second data model, calculating parameters of a first force to be fed back to the user for feeling touch by the robot on the physical object corresponding to the virtual object; and
sending parameters of the first force to the controller of the robot, to drive the robot to feed back the first force to the user.

According to a third embodiment of the present disclosure, an apparatus for robotic programming is presented, it comprises:
a data model setting up module, configured to
set up a first data model of a robot; and
set up a second data model of a virtual object;
a communication module, configured to receive, from a controller of the robot, movement parameters reflecting movement of the robot manipulated by a user; and
a data model controller, configured to
make the first data model move according to the movement parameters;
when the first data model touches the second data model, calculate parameters of a first force to be fed back to the user for feeling touch by the robot on the physical object corresponding to the virtual object; and
the communication module, further configured to send parameters of the first force to the controller of the robot, to drive the robot to feed back the first force to the user.

According to a fourth embodiment of the present disclosure, another apparatus for robotic programming is presented, it comprises:
a processor, configured to
set up a first data model of a robot;
set up a second data model of a virtual object; and
a receiver, configured to receiving, from a controller of the robot, movement parameters reflecting movement of the robot manipulated by a user;
the processor, further configured to
make the first data model move according to the movement parameters;
when the first data model touches the second data model, calculate parameters of a first force to be fed back to the user for feeling touch by the robot on the physical object corresponding to the virtual object;
a transmitter, configured to send parameters of the first force to the controller of the robot, to drive the robot to feed back the first force to the user.

According to a fifth embodiment of the present disclosure, a method for controlling a robot is presented, it comprises:
receiving parameters of a force;
sending the parameters of the force to at least one motor for at least one joint of the robot, to drive the robot to feed back the force to a user manipulating the robot for feeling at least one of the following items:
the robot's touch on an object;
interaction between an object and the environment the robot and the object are both in; and
the distance of the robot from an object;
wherein the object is a virtual object or a physical object.

According to a sixth embodiment of the present disclosure, a controller of a robot is presented, it comprises:
a first communication module, configured to receive parameters of a force; and
a second communication module, configured to send the parameters of the force to at least one motor for at least one joint of the robot, to drive the robot to feed back the force to a user manipulating the robot for feeling at least one of the following items:
the robot's touch on an object;
interaction between an object and the environment the robot and the object are both in; and
the distance of the robot from an object;
wherein the object is a virtual object or a physical object.

According to a seventh embodiment of the present disclosure, a controller of a robot is presented, it comprises:
a processor;
a memory in electronic communication with the processor, instructions being stored in the memory, the instructions being executable by the processor to:
receive parameters of a force;
send the parameters of the force to at least one motor for at least one joint of the robot, to drive the robot to feed back the force to a user manipulating the robot for feeling at least one of the following items:
the robot's touch on an object;
interaction between an object and the environment the robot and the object are both in; and
the distance of the robot from an object;
wherein the object is a virtual object or a physical object.

According to an eighth embodiment of the present disclosure, a robotic system, comprising a robot and a controller of the robot described above is presented.

According to a ninth embodiment of the present disclosure, a computer-readable storage media is presented, wherein the storage media has stored thereon:
instructions executable by one or more processors of a computer system, wherein execution of the instructions causes the computer system to perform the method executed by the controller of the robot or the apparatus for robotic programming.

According to an eleventh embodiment of the present disclosure, a computer program is presented. The computer program is being executed by one or more processors of a computer system and performs the method executed by the controller of the robot or the apparatus for robotic programming.

A solution is provided in at least one embodiment, in circumstances that a robot is being manipulated by a user interacting with a virtual object during teach-in programming. An approach that simulates a force to be fed back to a user is also proposed, so that the user can feel the physical feedback of the virtual object that exists in simulation only. To implement this approach, no additional sensors or motors are required.

As a result of the present disclosure, wherein the apparatus for robotic programming calculates parameters of the first force according to at least one kind of the following parameters of the physical object corresponding to the virtual object:
parameters of geometry;
parameters of physical properties;
parameters of position.

With input of the parameters needed during calculation of the first force, a precise first force can be got.

In an embodiment of the present disclosure, the apparatus for robotic programming first calculates parameters of a second force to be fed back to the robot by a physical object corresponding to the virtual object, and then calculates parameters of the second force according to the first force.

So that the apparatus for robotic programming can calculate the second force via a physical engine.

In another embodiment of the present disclosure, the apparatus for robotic programming also sets up a third data model of the environment which the robot is in and the virtual object is supposed to be in, and after the second data model is gripped by the first data model, moves the second data model together with the first data model, and on detecting interaction between the second data model and the third data model, calculating parameters of a third force to be fed back to the user for feeling interaction between the physical object corresponding to the virtual object and the environment, then sends parameters of the third force to the controller of the robot, to drive the robot to feed back the third force to the user. So the user can also feel the interaction between the physical object corresponding to the virtual object with the environment.

In another embodiment of the present disclosure, before the first data model touches the second data model, the apparatus for robotic programming further measures the distance between the first data model and the second data model, and if the distance is larger than a first distance threshold, turns off a switch for sending parameters of a force to the controller of the robot, and if the distance is not larger than the first distance threshold, turns on the switch, calculates according to the distance parameters of a fourth force to be fed back by the robot to the user for feeling the distance, and sends parameters of the fourth force to the controller of the robot, to drive the robot to feed back the fourth force to the user. So that the user can feel the distance between the robot and the physical object corresponding to the virtual object even without seeing the virtual object.

In another embodiment of the present disclosure, the controller of the robot receives parameters of a force, sends the parameters of the force to at least one motor for at least one joint of the robot, to drive the robot to feed back the force to a user manipulating the robot for feeling at least one of the following items:
the robot's touch on an object;
interaction between an object and the environment the robot and the object are both in; and
the distance of the robot from an object;
wherein the object is a virtual object or a physical object.

Hereinafter, above-mentioned and other features of the present technique are described in details. Various embodiments are described with reference to the drawing, wherein like reference numerals are used to refer to like elements throughout. In the following description, for purpose of explanation, numerous specific details are set forth in order to provide a thorough understanding of one or more embodiments. It may be noted that the illustrated embodiments are intended to explain, and not to limit the invention. It may be evident that such embodiments may be practiced without these specific details.

The present technique has been described hereinafter in details by referring to FIG. 1 to FIG. 11.

FIG. 1 schematically represents an example embodiment of a robotic programming system 100 of the present disclosure. The robotic programming system 100 comprises:
a robot 10 connected with a controller 20 of the robot 10, and manipulate by a user 60 to move. There is at least one encoder 101 which senses the movements of the robot 10, and send movement parameters to the controller 20 of the robot 10. There can be some transitions between received movement parameters and the sent out ones for convenience of transmission and/or information recognition.

the controller 20 of the robot 10 on one hand connected to the at least one encoder 101 and at least one motor 103, on the other hand is connected to an apparatus 30 for robotic programming. The controller 20 of the robot 10 is configured to send receiving movement parameters of the robot 10 to the apparatus 30, and receive parameters of a force to control the robot 10 to feedback to the user 60. Optionally, there is at least one motor 103 and at least one encoder 101 corresponding to each joint of the robot 10, the motor 103 and the encoder 10 can be installed inside joints of the robot 10.

the apparatus 30 for robotic programming, configured to set up data models of the robot 10 (a first data model), a virtual object 40 (a second data model), and optionally the environment 50 the robot 10 is in and the virtual object 40 is supposed to be in (a third data model). The apparatus 30 can also describe the position relations between the robot 10, the virtual object 40 and the environment. The apparatus 30 is further configured to receive, from the controller 20 of the robot 10, movement parameters reflecting movement of the robot 10 manipulated by a user 60, then move the first data model according to the movement parameters, when the first data model touches the second data model, calculate parameters of a second force to be fed back to the robot 10 by a physical object correspond to the virtual object 40, and further calculate, according to the second force, parameters of a first force to be fed back to the user 60 for feeling touch by the robot 10 on the physical object corresponding to the virtual object 40, and send parameters of the first force to the controller 20 of the robot 10.

By the way, the environment 50 includes but is not limited to at least one of the following items:
A console, table, trolley, another object (virtual or physical), obstacles, structural features such as walls, parts of the robot 10, etc. Optionally, the apparatus 30 can be further configured to monitor possible interaction between the second data model and the third data model. After the second data model is gripped by the first data model, move the second data model together with the first data model; if interaction between the second data model and the third data model is detected, the apparatus calculates parameters of a third force to be fed back to the user 60 for feeling interaction between the physical object corresponding to the virtual object 40 and the environment 50, and sends the parameters of the third force to the controller 20 of the robot 10, to drive the robot 10 to feedback the third force to the user 60.

Optionally, the apparatus 30 can be further configured to measure the distance between the first data model and the second data model, and if the distance is larger than a first distance threshold, turn off a switch for sending parameters of a force to the controller 20 of the robot 10, whereas if the distance is not larger than the first distance threshold, turn on the switch and calculate, according to the distance, parameters of a fourth force, to be fed back by the robot 10 to the user 60 for feeling the distance, then send parameters of the fourth force to the controller 20 of the robot 10, to drive the robot 10 to feed back the fourth force to the user 60.

Figure 2:
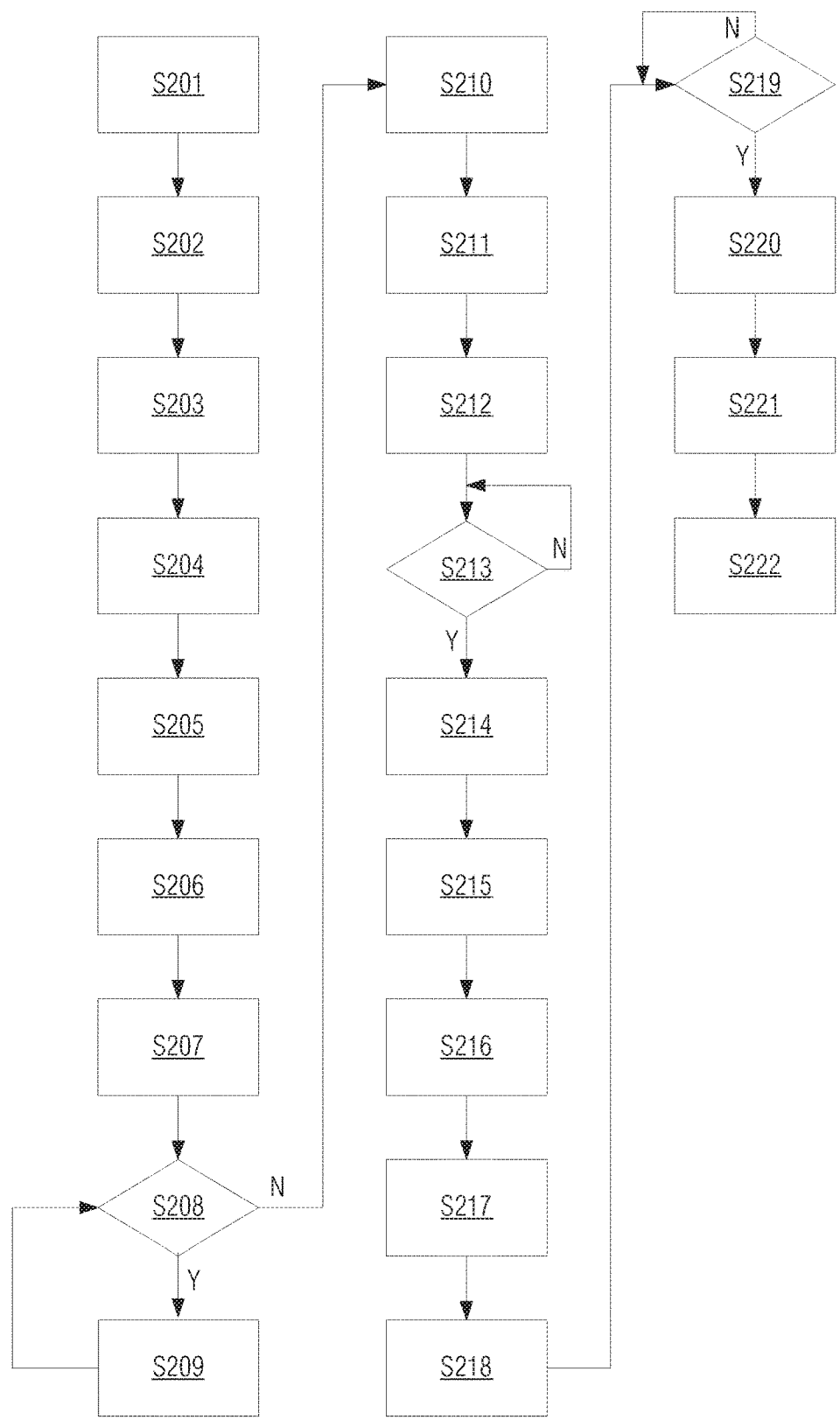
FIG. 2: Depicts a flowchart showing an example embodiment of a method of the present disclosure

FIG. 2 depicts a flowchart showing an example embodiment of a method of the present disclosure. The method comprises following steps:
S201: apparatus 30 for robotic programming sets up a first data model of a robot 10. Optionally, the apparatus 30 for robotic programming can get parameters of the robot 10 using external sensor, for example, camera, force sensor, etc. The parameters of the robot 10 can include, but not limited to: geometrical parameters, and position parameters in regards to the environment 50 the robot 10 is in.

S202: apparatus 30 for robotic programming sets up a second data model of a virtual object 40. There can be more than one virtual object 40. Methodology for programming with multiple virtual objects 40 can be same with one virtual object 40. The apparatus 30 for robotic programming can set up the second data model according to configuration data input, including but not limited to: geometrical parameters, physical property parameters such as stiffness, force to break it etc, and position parameters in regards to the robot 10 and the environment 50.

S203: apparatus 30 for robotic programming sets up a third data model of the environment 50. Optionally, the apparatus 30 for robotic programming can also get parameters of the environment 50 via at least one camera for setting up the third data model. The parameters of the robot 10 can include, but not limited to: geometrical parameters, and position parameters in regards to the robot.

Steps S201~S203 can be executed in other turn than S201, S202 and S203.

S204: the robot 10 is moved by a user 60, for example to grip an object with the robot 10' gripper 102. In this example embodiment, the object is the virtual object 40, which can't be seen by the user 60. But with the force feeding back mechanism provided in the following steps, the user 60 can feel the distance between the gripper 102 and the virtual object 40, also can feel touch by the gripper 102 on the virtual object 40 and interaction of the robot 10 with the environment 50.

S205: at least one encoder 101 for each joint of the robot 10 collects movement parameters of the robot 10, and sends the collected movement parameters to the controller 20 of the robot 10. The movement parameters include but not limited to velocity, direction, accelerated velocity etc.

S206: the controller 20 of the robot 10 receives the movement parameters and sends to the apparatus 30 for robotic programming.

S207: the apparatus 30 for robotic programming makes the first data model move according to the movement parameters. The apparatus 30 can use simulation methods to make the first data model move.

S208: the apparatus 30 for robotic programming measures the distance between the first data model and the second data model. If the distance is larger than a first distance threshold (marked in the figure as "Y"), the procedure goes to step S209, otherwise (marked in the figure as "N"), the procedure goes to step S210.

S209: the apparatus 30 for robotic programming turns off a switch for sending parameters of a force to the controller 20 of the robot 10, or keeps the switch off as long as the distance is larger than the first distance threshold. The apparatus 30 for robotic programming returns to step S208, keep on measuring the distance and making the judgment. The distance threshold can be set according to the usual moving speed of the robot 10, the size of the robot 10 etc.

S210: once the distance is not larger than the first distance threshold, the apparatus 30 for robotic programming turns on the switch and calculates according to the distance, parameters of a fourth force, to be fed back by the robot 10 to the user 60 for feeling the distance. Optionally, the apparatus 30 for robotic programming calculates the parameters of the fourth force as such that the user 60 can feel the orientation of the virtual object 40 and the distance of the gripper 101 from the virtual object 40. And the apparatus 30 for robotic programming can calculate the parameters of the fourth force via a physics engine.

S211: the apparatus 30 for robotic programming sends the parameters of the fourth force to the controller 20 of the robot 10.

S212: the controller 20 of the robot 10 sends the received parameters of the fourth force to the at least one motor 103, then the at least one motor 103 drives the robot 10 to feed back the fourth force to the user 60 for feeling the distance of the robot 10 from the virtual object 40.

S213: the apparatus 30 for robotic programming monitors whether the first data model touches the second data model. If the first data model touches the second data model (marked in the figure as "Y"), the procedure goes to step S214; otherwise (marked in the figure as "N") the apparatus 30 for robotic programming keeps on monitoring.

S214: the apparatus 30 for robotic programming calculates parameters of a second force to be fed back to the robot 10 by a physical object corresponding to the virtual object 40. Here apparatus for robotic programming 30 can calculate the parameters of a force via a physics engine. Wherein, the apparatus 30 can calculate parameters of the second force according to at least one kind of the following parameters of the physical object corresponding to the virtual object 40:

parameters of geometry;

parameters of physical properties;

parameters of position.

S215: the apparatus 30 for robotic programming calculates, according to the second force, parameters of a first force to be fed back to the user 60 for feeling touch by the robot 10 on the physical object corresponding to the virtual object 40.

To be noted that, the apparatus 30 can first calculate the second force, and then calculate the first force according to the second force, as described above. Whereas, the apparatus 30 can also calculate the first force directly without calculation of the second force.

S216: the apparatus 30 for robotic programming sends parameters of the first force to the controller 20 of the robot 10.

S217: the controller 20 of the robot 10 sends the received parameters of the first force to the at least one motor 103, then the at least one motor 103 drive the robot 10 to feed back the first force to the user 60.

S218: after the second data model is gripped by the first data model, the apparatus 30 for robotic programming moves the second data model together with the first data model.

S219: the apparatus 30 for robotic programming monitors interaction between the second data model and the third data model. If the apparatus 30 for robotic programming detects the interaction between the second data model and the third data model (marked in the figure as "Y"), the procedure goes to step S220, otherwise (marked in the figure as "N") the apparatus 30 for robotic programming keeps on monitoring the interaction.

S220: the apparatus 30 for robotic programming calculates parameters of a third force 803 to be fed back to the user 60 for feeling the interaction between the physical object corresponding to the virtual object 40 and the environment 50. The apparatus 30 for robotic programming can calculate the parameters of the third force 803 via a physics engine.

S221: the apparatus 30 for robotic programming sends parameters of the third force 803 to the controller 20 of the robot 10.

S222: the controller 20 of the robot 10 sends the received parameters of the third force 803 to the at least one motor 103, then the at least one motor 103 drive the robot 10 to feed back the third force 803 to the user 60.

Figure 9:
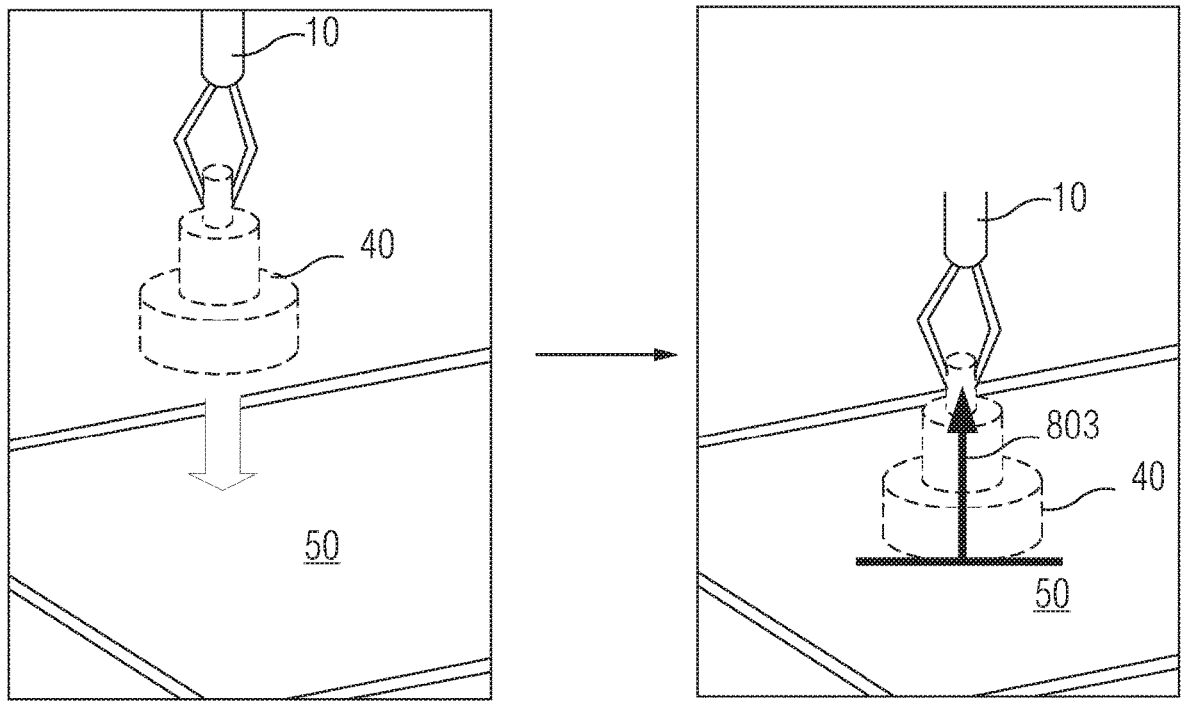
FIGS. 9-11: Depict interactions between data models and force fed back to the user Reference numerals.
Figure 10:
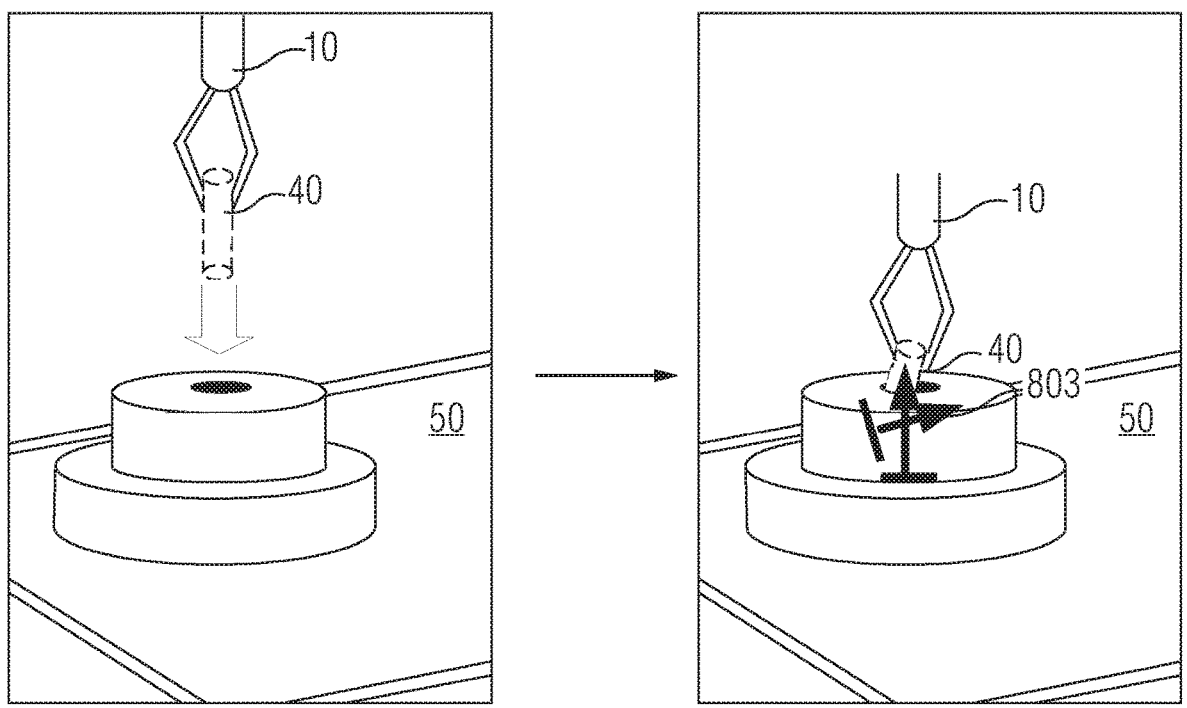
Figure 11:
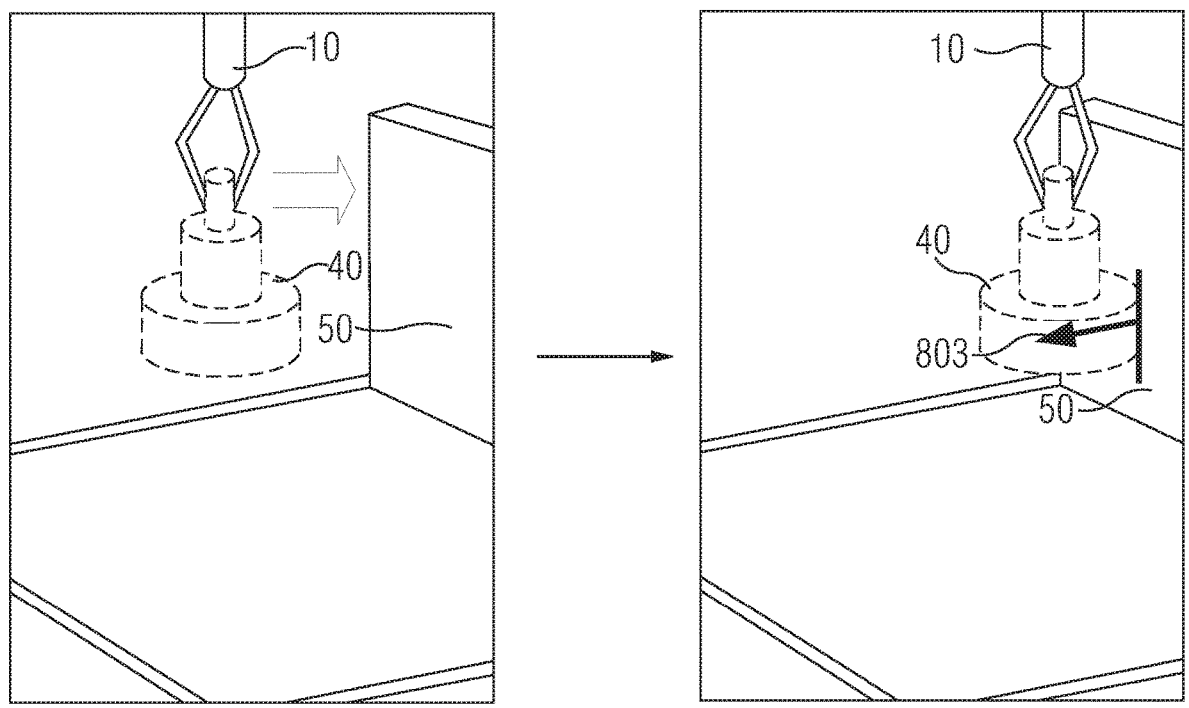

FIG. 9~FIG. 11 shows 3 examples of interaction between the second data model and the third data model, also shows the third force 803 to be fed back to the user 60. In FIG. 9, the first data model grips the second data model and put it on the third data model (a table as environment 50). There is a collision of the second data model against the third data model. In FIG. 10, the first data model grips the second data model and put into the third data model (a work piece with a hold in the middle as environment 50). There is an interaction between the inner side wall and the second data model, also an interaction between the inner bottom and the second model. The third force fed back to the user 60 can be a result of combination of the 2 interactions or each of the 2 interaction separately. In FIG. 11, the first data model grips the second data model and hit the third data model (an obstacle as environment 50). There is a collision of the second data model against the third data model.

Figure 3:
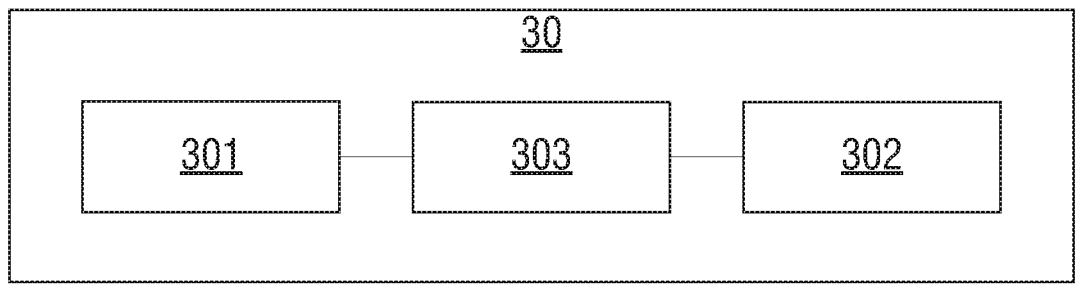
FIG. 3: Depicts a block diagram showing a first example embodiment of an apparatus for robotic programming of the present disclosure

FIG. 3 depicts a block diagram showing a first example embodiment of the apparatus 30 for robotic programming of the present disclosure. The apparatus 30 for robotic programming comprises:

a data model setting up module 301, configured to set up a first data model of a robot 10, and set up a second data model of a virtual object 40;

a communication module 302, configured to receive, from a controller 20 of the robot 10, movement parameters reflecting movement of the robot 10 manipulated by a user 60;

a data model controller 303, configured to move the first data model according to the movement parameters; when the first data model touches the second data model, calculate parameters of a first force to be fed back to the user 60 for feeling touch by the robot 10 on the physical object corresponding to the virtual object 40; and the communication module 302, further configured to send parameters of the first force to the controller 20 of the robot 10, to drive the robot 10 to feedback the first force to the user 60.

Optionally, the data model controller 303 first calculates parameters of a second force to be fed back to the robot 10 by a physical object corresponding to the virtual object 40; then calculates, according to the second force, parameters of a first force to be fed back to the user 60 for feeling touch by the robot 10 on the physical object corresponding to the virtual object 40.

Optionally, the data model controller 303 calculates the parameters of the first force according to at least one kind of the following parameters of the physical object corresponding to the virtual object 40:
parameters of geometry;
parameters of physical properties;
parameters of position.

Optionally, the data model setting up module 301 can be further configured to set up a third data model of the environment 50 which the robot 10 is in and the virtual object 40 is supposed to be in. The data model controller 303, can be further configured to: after the second data model is gripped by the first data model, move the second data model together with the first data model; and on detecting interaction between the second data model and the third data model, calculate parameters of a third force to be fed back to the user 60 for feeling interaction between the physical object corresponding to the virtual object 40 and the environment 50. The communication module 302 can be further configured to send parameters of the third force to the controller 20 of the robot 10, to drive the robot 10 to feed back the third force to the user 60.

Optionally, the data model controller 303 can be further configured to: after setting up the first data model and the second data model, before the first data model touches the second data model, measure the distance between the first data model and the second data model; and if the distance is larger than a first distance threshold, turn off a switch for sending parameters of a force to the controller 20 of the robot 10. And if the distance is not larger than the first distance threshold, turn on the switch, the data model controller 303 can be further configured to calculate, according to the distance, parameters of a fourth force, to be fed back by the robot 10 to the user 60 for feeling the distance; and send parameters of the fourth force to the controller 20 of the robot 10, to drive the robot 10 to feed back the fourth force to the user 60.

Figure 4:
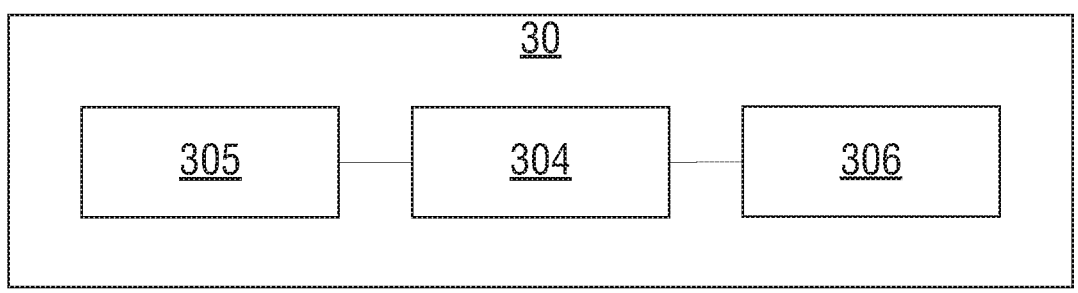
FIG. 4: Depicts a block diagram showing a second example embodiment of an apparatus for robotic programming of the present disclosure

FIG. 4 depicts a block diagram showing a second example embodiment of the apparatus 30 for robotic programming of the present disclosure. The apparatus 30 comprises:

a processor 304, configured to set up a first data model of a robot 10, and set up a second data model of a virtual object 40;

a receiver 305, configured to receiving, from a controller 20 of the robot 10, movement parameters reflecting movement of the robot 10 manipulated by a user 60;

the processor 304, further configured to move the first data model according to the movement parameters; when the first data model touches the second data model, calculate parameters of a second force to be fed back to the robot 10 by a physical object corresponding to the virtual object 40; and calculate, according to the second force, parameters of a first force to be fed back to the user 60 for feeling touch by the robot 10 on the physical object corresponding to the virtual object 40;

a transmitter 306, configured to send parameters of the first force to the controller 20 of the robot 10, to drive the robot 10 to feed back the first force to the user 60.

Optionally, the processor 304, first calculates parameters of a second force to be fed back to the robot 10 by a physical object corresponding to the virtual object 40; and then calculates, according to the second force, parameters of a first force to be fed back to the user 60 for feeling touch by the robot 10 on the physical object corresponding to the virtual object 40.

Optionally, the processor 304 calculates the parameters of the first force according to at least one kind of the following parameters of the physical object corresponding to the virtual object 40:
parameters of geometry;
parameters of physical properties;
parameters of position.

Optionally, the processor 304 can be further configured to set up a third data model of the environment 50 which the robot 10 is in and the virtual object 40 is supposed to be in; after the second data model is gripped by the first data model, move the second data model together with the first data model; and on detecting interaction between the second data model and the third data model, calculate parameters of a third force to be fed back to the user 60 for feeling interaction between the physical object corresponding to the virtual object 40 and the environment 50. The transmitter 306 can be further configured to send parameters of the third force to the controller 20 of the robot 10, to drive the robot 10 to feed back the third force to the user 60.

Optionally, the processor 304 can be further configured to: after setting up the first data model and the second data model, before the first data model touches the second data model, measure the distance between the first data model and the second data model; and if the distance is larger than a first distance threshold, turn off a switch for sending parameters of a force to the controller 20 of the robot 10. And if the distance is not larger than the first distance threshold, the processor 304 can be further configured to turn on the switch, calculate, according to the distance, parameters of a fourth force, to be fed back by the robot 10 to the user 60 for feeling the distance. The transmitter 306, further can be configured to send parameters of the fourth force to the controller 20 of the robot 10, to drive the robot 10 to feed back the fourth force to the user 60.

Figure 5:
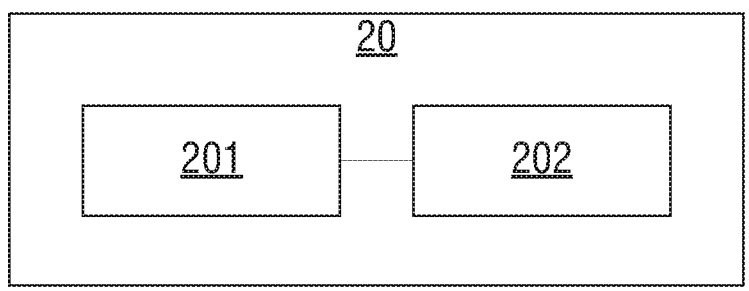
FIG. 5: Depicts a block diagram showing a first example embodiment of a controller of a robot of the present disclosure

FIG. 5 depicts a block diagram showing a first example embodiment of the controller 20 of a robot 10 of the present disclosure. The controller 20 comprises:

a first communication module 201, configured to receive parameters of a force; and a second communication module 202, configured to send the parameters of the force to at least one motor 103 for each joint of the robot 10, to drive the robot 10 to feedback the force to a user 60 manipulating the robot 10 for feeling at least one of the following items: the robot 10's touch on an object, interaction between an object and the environment 50 the robot 10 and the object are both in, and the distance of the robot 10 from an object.

Optionally, the mentioned object is a virtual object 40 or a physical object.

Optionally, the first communication module 201 can be further configured to receive movement parameters from the at least one encoder 101, and the second communication module 202 can be further configured to send the received movement parameters to the apparatus 30, for the apparatus 30's simulation of the movement of the robot 10.

Figure 6:
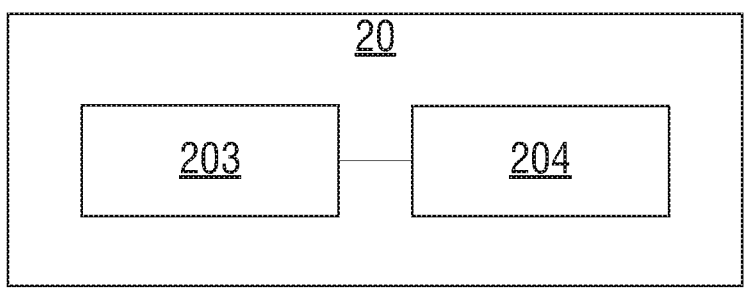
FIG. 6: Depicts a block diagram showing a second example embodiment of a controller of a robot of the present disclosure

FIG. 6 depicts a block diagram showing a second example embodiment of the controller 20 of the robot 10 of the present disclosure. The controller 20 comprises:

a processor 203;

memory 204 in electronic communication with the processor 203; and instructions stored in the memory 204, the instructions being executable by the processor 203 to receive parameters of a force and send the parameters of the force to at least one motor 103 for each joint of the robot 10, to drive the robot 10 to feed back the force to a user 60 manipulating the robot 10 for feeling at least one of the following items: the robot 10's touch on an object, interaction between an object and the environment 50 the robot 10 and the object are both in, and the distance of the robot 10 from an object.

Optionally the mentioned object is a virtual object 40 or a physical object.

Optionally, the instructions can further implement receipt of movement parameters from the at least one encoder 101, transmission of the received movement parameters to the apparatus 30, for the apparatus 30's simulation of the movement of the robot 10.

Furthermore, a computer-readable storage media is also presented in the present disclosure, which has stored thereon instructions executable by one or more processors of a computer system, wherein execution of the instructions causes the computer system to perform the method according to the method for robotic programming, or the method for controlling a robot provided in the present disclosure.

Furthermore, a computer program is also provided in the present disclosure, which is being executed by one or more processors of a computer system and performs the method for robotic programming, or the method for controlling a robot provided in the present disclosure.

Figure 7:
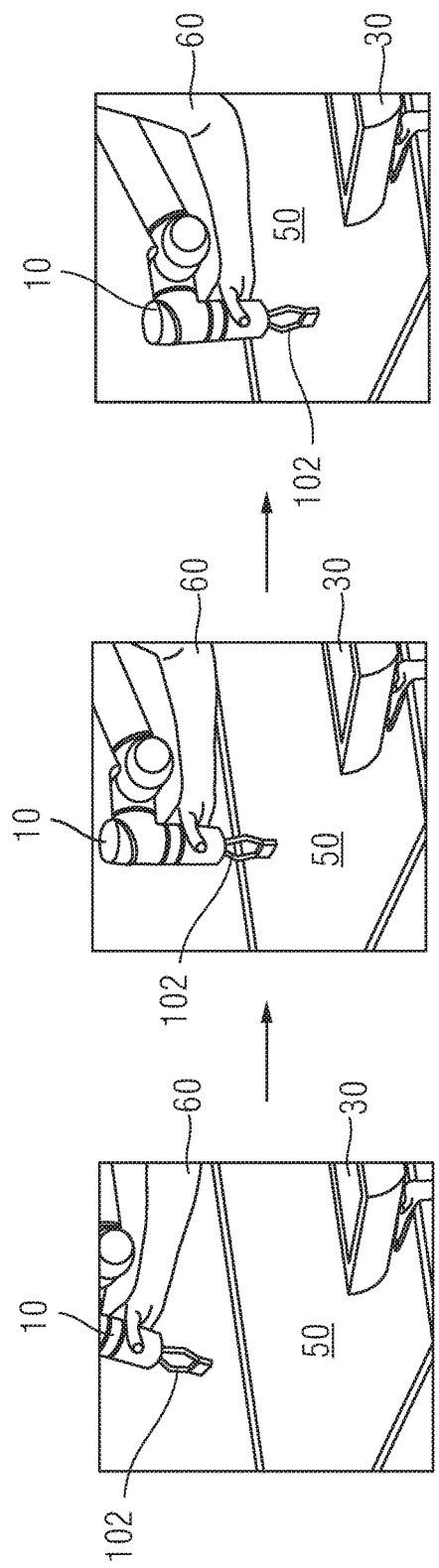
FIG. 7: Depicts teaching sequences provided by the present disclosure
Figure 8:
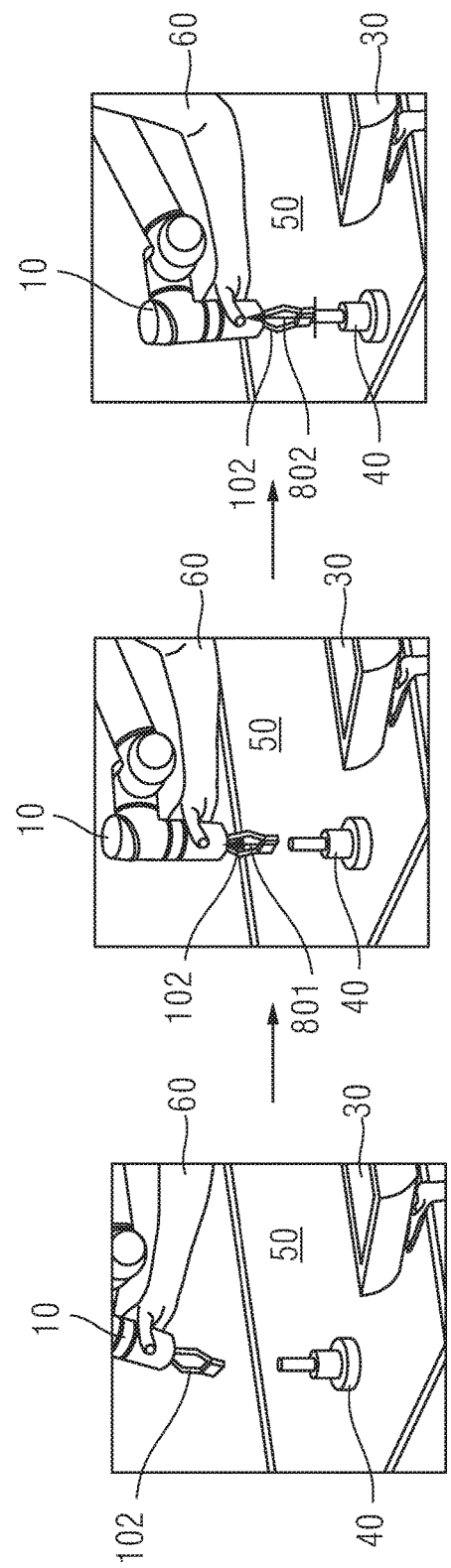
FIG. 8: Depicts teaching sequences in FIG. 5 with virtual objects and force feedback

FIG. 7 depicts teaching sequences provided by the present disclosure. FIG. 8 depicts teaching sequences in FIG. 7, showing out the virtual object 40 and the force feeding back to the user 60.

The force feedback technique is used in the present disclosure to give force feedback to the user 60 to let the user 60 feel the physical feedback of the virtual object 40, which makes the programming procedures go smoothly and efficiently. In FIG. 7, the user 60 is teaching the robot 10 (a robot arm) which is interacting with the virtual object 40 (a work piece). In FIG. 8, the same teaching sequence in FIG. 7 is shown, wherein, the virtual object 40 and the generated feedback forces (the first force 802 and the fourth force 801) are shown out. Even though the work piece is invisible, the user 60 can teach the robot to grip it (in the left). When the gripper 102 is far away from the work piece, the switch for force feedback is off (in the left). When the gripper 102 approaches the work piece, the robot 10 gives tactile feedback to the user 60 proportional to the distance to the work piece (in the middle). When the gripper 102 is already "in contact" with the work piece, the robot 10 can forbid any further movement towards the work piece.

The present disclosure provides a method, apparatus for robotic programming and a robot, to provide a solution to give force feedback to a user manipulating a robot during teach-in programming, to let the user feel the physical feedback of a virtual object, which makes the programming procedures go smoothly and efficiently. Following advantages can be achieved:

Combining physical and virtual objects in a very intuitive manner;

Reducing teach-in times;

Immediate feedback for the user;

No need to use physical objects;

Usable for teach-in programming with very large/heavy objects without needing to manipulate the real object during the teach-in process;

No additional hardware required, etc.

While the present technique has been described in detail with reference to certain embodiments, it should be appreciated that the present technique is not limited to those precise embodiments. Rather, in view of the present disclosure which describes example modes for practicing the invention, many modifications and variations would present themselves, to those skilled in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for robotic programming, comprising:
    manipulating, by a user, a robot by physically moving the robot via direct contact by the user;
    receiving, from a controller of a robot as a user is teaching the robot, movement parameters reflecting movement of the robot manipulated by the user;
    moving a first data model of a robot, according to the movement parameters;
    calculating, in response to the first data model touching a second data model of a virtual object, parameters of a first force to be fed back to the user for feeling touch by the robot on a physical object corresponding to the virtual object that exists in simulation only, the virtual object being a work piece; and
    sending the parameters of the first force to the controller of the robot, to drive the robot to feed back the first force to the user.

2. The method of claim 1, wherein the calculating of the parameters of the first force includes:
    calculating parameters of the first force according to at least one kind of a parameter of the physical object corresponding to the virtual object, the at least one kind of parameter including at least one of:
    parameters of geometry;
    parameters of physical properties; or
    parameters of position.

3. The method of claim 2, further comprising,
    moving, after the second data model is gripped by the first data model, the second data model together with the first data model;
    calculating, in response to detecting interaction between the second data model and a third data model of an environment which the robot is in and the virtual object is simulated in, parameters of a third force to be fed back to the user for feeling interaction between the physical object corresponding to the virtual object and the environment; and
    sending parameters of the third force to the controller of the robot, to drive the robot to feed back the third force to the user.

4. The method of claim 2, further comprising, before the first data model touches the second data model,
    measuring a distance between the first data model and the second data model; and
    turning off, in response to the distance being relatively larger than a first distance threshold, a switch for sending parameters of a force to the controller of the robot.

5. The method of claim 4, further comprising, before the first data model touches the second data model, in response to the distance not being relatively larger than the first distance threshold,
    turning on the switch;
    calculating, according to the distance, parameters of a fourth force, to be fed back by the robot to the user for feeling the distance; and
    sending parameters of the fourth force to the controller of the robot, to drive the robot to feed back the fourth force to the user.

6. The method of claim 1, further comprising,
    moving, after a second data model is gripped by the first data model, the second data model together with the first data model;
    calculating, in response to detecting interaction between the second data model and a third data model of an environment which the robot is in and the virtual object is simulated in, parameters of a third force to be fed back to the user for feeling interaction between the physical object corresponding to the virtual object and the environment; and
    sending parameters of the third force to the controller of the robot, to drive the robot to feed back the third force to the user.

7. The method of claim 6, further comprising, before the first data model touches the second data model,
    measuring a distance between the first data model and the second data model; and
    turning off, in response to the distance being relatively larger than a first distance threshold, a switch for sending parameters of a force to the controller of the robot.

8. The method of claim 7, further comprising, before the first data model touches the second data model, in response to the distance not being relatively larger than the first distance threshold,
    turning on the switch;
    calculating, according to the distance, parameters of a fourth force, to be fed back by the robot to the user for feeling the distance; and
    sending parameters of the fourth force to the controller of the robot, to drive the robot to feed back the fourth force to the user.

9. The method of claim 1, further comprising, before the first data model touches the second data model,
    measuring a distance between the first data model and the second data model; and turning off, in response to the distance being relatively larger than a first distance threshold, a switch for sending parameters of a force to the controller of the robot.

10. The method of claim 9, further comprising, before the first data model touches the second data model, in response to the distance not being relatively larger than the first distance threshold,
   turning on the switch;
   calculating, according to the distance, parameters of a fourth force, to be fed back by the robot to the user for feeling the distance; and
   sending parameters of the fourth force to the controller of the robot, to drive the robot to feed back the fourth force to the user.

11. The method of claim 9, further comprising, in response to the distance not being relatively larger than the first distance threshold and the first data model not being in contact with the second data model:
   turning on the switch;
   calculating, according to the distance, parameters of a fourth force, to be fed back by the robot to the user for feeling the distance; and
   sending parameters of the fourth force to the controller of the robot, to drive the robot to feed back the fourth force to the user.

12. The method of claim 1, wherein the calculating the parameters of the first force includes:
   calculating a second force to be fed back to the robot by the virtual object; and
   calculating the first force based on the second force.

13. An apparatus for robotic programming, comprising:
   a receiver configured to receive, from a controller of a robot as a user is teaching the robot, movement parameters reflecting movement of the robot, the movement of the robot caused by the user physically moving the robot via direct contact by the user;
   a processor, configured to cause the apparatus to
      move a first data model of a robot, according to the movement parameters,
      calculate, in response to the first data model touching a second data model of a virtual object, parameters of a first force to be fed back to the user for feeling touch by the robot on a physical object corresponding to the virtual object that exists in simulation only, the virtual object being a work piece; and
   a transmitter, configured to send parameters of the first force to the controller of the robot, to drive the robot to feed back the first force to the user.

14. The apparatus of claim 13, wherein the processor is further configured to cause the apparatus to:
   calculate parameters of the first force according to at least one kind of a parameter of the physical object corresponding to the virtual object, the at least one kind of parameter including at least one of:
   parameters of geometry;
   parameters of physical properties; or
   parameters of position.

15. The apparatus of claim 13, wherein the processor is further configured to cause the apparatus to:
   move, after a second data model is gripped by the first data model, the second data model together with the first data model;
   calculate, in response to detecting interaction between the second data model and a third data model of an environment which the robot is in and the virtual object is simulated in, parameters of a third force to be fed back to the user for feeling interaction between the physical object corresponding to the virtual object and the environment; and
   send parameters of the third force to the controller of the robot, to drive the robot to feed back the third force to the user.

16. The apparatus of claim 13, wherein the processor is further configured to, before the first data model touches the second data model, cause the apparatus to:
   measure a distance between the first data model and the second data model; and
   turn off, in response to the distance being relatively larger than a first distance threshold, a switch for sending parameters of a force to the controller of the robot.

17. The apparatus of claim 16, wherein the processor is further configured to, before the first data model touches the second data model and upon the distance not being relatively larger than the first distance threshold, cause the apparatus to:
   turn on the switch;
   calculate, according to the distance, parameters of a fourth force, to be fed back by the robot to the user for feeling the distance; and
   send parameters of the fourth force to the controller of the robot, to drive the robot to feed back the fourth force to the user.

18. A non-transitory computer-readable storage media storing instructions, executable by one or more processors of a computer system, wherein execution of the instructions causes the computer system to perform at least:
   receiving, from a controller of a robot as a user is teaching the robot, movement parameters reflecting movement of the robot, the movement of the robot caused by the user physically moving the robot via direct contact by the user;
   moving a first data model of a robot, according to the movement parameters;
   calculating, in response to the first data model touching a second data model of a virtual object, parameters of a first force to be fed back to the user for feeling touch by the robot on a physical object corresponding to the virtual object that exists in simulation only, the virtual object being a work piece; and
   sending parameters of the first force to the controller of the robot, to drive the robot to feed back the first force to the user.

19. The non-transitory computer-readable storage media of claim 18, wherein execution of the instructions causes the computer system to perform, when calculating parameters of a first force, at least:
   calculating parameters of the first force according to at least one kind of a parameter of the physical object corresponding to the virtual object, the at least on kind of parameter including at least one of:
   parameters of geometry;
   parameters of physical properties; or
   parameters of position.

20. The non-transitory computer-readable storage media of claim 18, wherein execution of the instructions causes the computer system to further perform at least:
   moving, after the second data model is gripped by the first data model, the second data model together with the first data model;
   calculating, upon detecting interaction between the second data model and a third data model of an environment which the robot is in and the virtual object is virtually in, parameters of a third force to be fed back to the user for feeling interaction between the physical object corresponding to the virtual object and the environment; and sending parameters of the third force to the controller of the robot, to drive the robot to feed back the third force to the user.

21. The non-transitory computer-readable storage media of claim 18, wherein execution of the instructions causes the computer system to further perform, before the first data model touches the second data model, at least:

measuring a distance between the first data model and the second data model; and turning off, in response to the distance being relatively larger than a first distance threshold, a switch for sending parameters of a force to the controller of the robot.

22. The non-transitory computer-readable storage media of claim 21, wherein execution of the instructions causes the computer system to perform, before the first data model touches the second data model and in response to the distance not being relatively larger than the first distance threshold:

turning on the switch;

calculating, according to the distance, parameters of a fourth force, to be fed back by the robot to the user for feeling the distance; and sending parameters of the fourth force to the controller of the robot, to drive the robot to feed back the fourth force to the user.

\* \* \* \* \*